(12) United States Patent
Meike et al.

(10) Patent No.: US 9,542,144 B2
(45) Date of Patent: Jan. 10, 2017

(54) SYSTEM AND METHOD FOR DOCUMENT TRANSMISSION FROM A COMPUTING DEVICE TO A PORTABLE ELECTRONIC DEVICE

(71) Applicant: BlackBerry Limited, Waterloo (CA)

(72) Inventors: Roger Charles Meike, Redwood City, CA (US); David Paul Yach, Waterloo (CA); Richard John George, Waterloo (CA); Tu Dien Do, Kanata (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 14/880,405

(22) Filed: Oct. 12, 2015

(65) Prior Publication Data

US 2016/0034236 A1    Feb. 4, 2016

Related U.S. Application Data

(63) Continuation of application No. 14/263,702, filed on Apr. 28, 2014, now Pat. No. 9,159,006, which is a
(Continued)

(51) Int. Cl.
*G06F 3/12* (2006.01)
*H04L 12/58* (2006.01)
(Continued)

(52) U.S. Cl.
CPC .............. *G06F 3/1287* (2013.01); *G06F 3/122* (2013.01); *G06F 3/1219* (2013.01); *G06F 3/1222* (2013.01); *G06F 3/1231* (2013.01); *G06F 3/1238* (2013.01); *G06F 3/1285* (2013.01); *G06F 3/1286* (2013.01); *G06F 3/1289* (2013.01); *G06F 3/1297* (2013.01); *G06K 15/1889* (2013.01); *H04L 12/5835* (2013.01); *H04L 12/5895* (2013.01); *H04L 51/38* (2013.01); *H04L 61/103* (2013.01); *H04L 61/15* (2013.01); *H04L 61/2076* (2013.01); *H04L 61/2575* (2013.01); *H04L 61/2589* (2013.01); *H04L 67/2823* (2013.01); *H04L 67/2895* (2013.01); *H04L 67/303* (2013.01); *H04M 1/72522* (2013.01); *G06F 3/1225* (2013.01);
(Continued)

(58) Field of Classification Search
None
See application file for complete search history.

(56) References Cited

U.S. PATENT DOCUMENTS 6,301,609 B1    10/2001    Aravamudan et al.
6,886,036 B1    4/2005    Santamaki et al.
(Continued)

FOREIGN PATENT DOCUMENTS

EP        1832971        9/2007

OTHER PUBLICATIONS

ACTPrinter—Virtual Printer for iPhone/iPad; 2005; http://www.houdah.com/ACTPrinter.
(Continued)

*Primary Examiner* — Qian Yang
(74) *Attorney, Agent, or Firm* — Jon Gibbons; Fleit Gibbons Gutman Bongini & Bianco P.L.

(57) ABSTRACT

The present specification provides an managing a document using printer emulation.

20 Claims, 10 Drawing Sheets

Related U.S. Application Data continuation of application No. 13/570,337, filed on Aug. 9, 2012, now Pat. No. 8,736,860, which is a continuation of application No. PCT/US2011/056385, filed on Oct. 14, 2011.

(60) Provisional application No. 61/471,594, filed on Apr. 4, 2011, provisional application No. 61/473,488, filed on Apr. 8, 2011.

(51) Int. Cl.

| | | |
|---|---|---|
| *H04L 29/12* | (2006.01) | |
| *H04M 1/725* | (2006.01) | |
| *H04L 29/08* | (2006.01) | |
| *G06K 15/02* | (2006.01) | |

(52) U.S. Cl.
CPC .......... *G06F 3/1267* (2013.01); *G06F 3/1288* (2013.01); *G06F 2206/1512* (2013.01)

(56) References Cited

U.S. PATENT DOCUMENTS

| | | | |
|---|---|---|---|
| 6,978,378 | B1 | 12/2005 | Koretz |
| 7,375,835 | B1* | 5/2008 | Hull ................ H04L 51/08 358/1.15 |
| 7,405,844 | B2 | 7/2008 | Ferlitsch |
| 7,522,675 | B2 | 4/2009 | Sheynman et al. |
| 7,889,374 | B2 | 2/2011 | Wang et al. |
| 8,736,860 | B2 | 5/2014 | Meike et al. |
| 9,159,006 | B2 | 10/2015 | Meike et al. |
| 2002/0003535 | A1* | 1/2002 | Cho ................ H04L 12/5835 345/204 |
| 2003/0220994 | A1 | 11/2003 | Zhu |
| 2004/0205453 | A1 | 10/2004 | Mortensen |
| 2006/0033956 | A1 | 2/2006 | Takahashi |
| 2007/0030509 | A1 | 2/2007 | Garg et al. |
| 2007/0234354 | A1 | 10/2007 | Hattori |
| 2007/0240042 | A1 | 10/2007 | Sato |
| 2008/0231886 | A1 | 9/2008 | Wehner et al. |
| 2009/0168113 | A1 | 7/2009 | Penkov |
| 2009/0204606 | A1* | 8/2009 | Osada ............... G06F 17/30132 |
| 2010/0093321 | A1* | 4/2010 | Ventola ............ H04M 3/42161 455/414.1 |
| 2010/0097637 | A1 | 4/2010 | Gha |
| 2010/0131358 | A1 | 5/2010 | Ueshima |
| 2010/0275115 | A1 | 10/2010 | Oh et al. |
| 2011/0157215 | A1* | 6/2011 | Aoyagi ................ G06F 3/147 345/593 |
| 2011/0302009 | A1 | 12/2011 | Freed et al. |

OTHER PUBLICATIONS

Schroeder, Kurt; IBM Systems Magazine; "Encrypted Printing via Internet Printing Protocol"; Jun. 2007.
Lardinois, Frederic; "Read It Later: iPhone Bookmarking and Offline Reading on Steroids" Apr. 10, 2009.
Print 2 Phone; 2010; http://alfoldinorbert.hu/print2phone/.
iPrinter—Turn iPad into a printer; Apr. 7, 2010.
Wikipedia; "Internet Printing Protocol"; modified on Jan. 22, 2011.
Ecamm Networks Printer Options; Mar. 3, 2011.
Good.iWare Ltd.; "GoodReader for iPad"; updated Mar. 4, 2011, retrieved Dec. 2, 2014.
Instapaper, "Instapaper on the iPhone, iPod touch, and iPad"; published Mar. 22, 2011; retrieved Dec. 4, 2012.
Savov, Vlad; "HTC Flyer parades its many unique qualities in latest video from the company."; Mar. 31, 2011; http://www.engadget.com/2011/03/31/htc-flyer-parades-its-many-unique-qualities-in-latest-video-from/.
Search Report from PCT Application No. PCT/US2011/056385; search completed Jan. 17, 2011.
Written Opinion from PCT Application No. PCT/US2011/056385; issued Jan. 17, 2011.
Office Action dated Nov. 7, 2012, received for U.S. Appl. No. 13/570,337.
Office Action dated Mar. 14, 2013, received for U.S. Appl. No. 13/570,337.
Office Action dated Sep. 17, 2013, received for U.S. Appl. No. 13/570,337.
Office Action dated Sep. 17, 2014, received for U.S. Appl. No. 14/263,702.
Office Action dated Jan. 20, 2015, received for U.S. Appl. No. 14/263,702.
Office Action dated Dec. 2, 2015, received for U.S. Appl. No. 14/880,405.
Office Action dated Apr. 12, 2016, received for U.S. Appl. No. 14/880,405.

* cited by examiner

SYSTEM AND METHOD FOR DOCUMENT TRANSMISSION FROM A COMPUTING DEVICE TO A PORTABLE ELECTRONIC DEVICE

FIELD

The present specification relates generally to computing devices and more specifically relates to a document management system using printer emulation.

BACKGROUND

Portable computing devices are increasingly powerful. Likewise more progress is being made towards paperless environments. Portable computing devices can support the goals of achieving paperless environments.

DETAILED DESCRIPTION OF THE EMBODIMENTS

Figure 1:
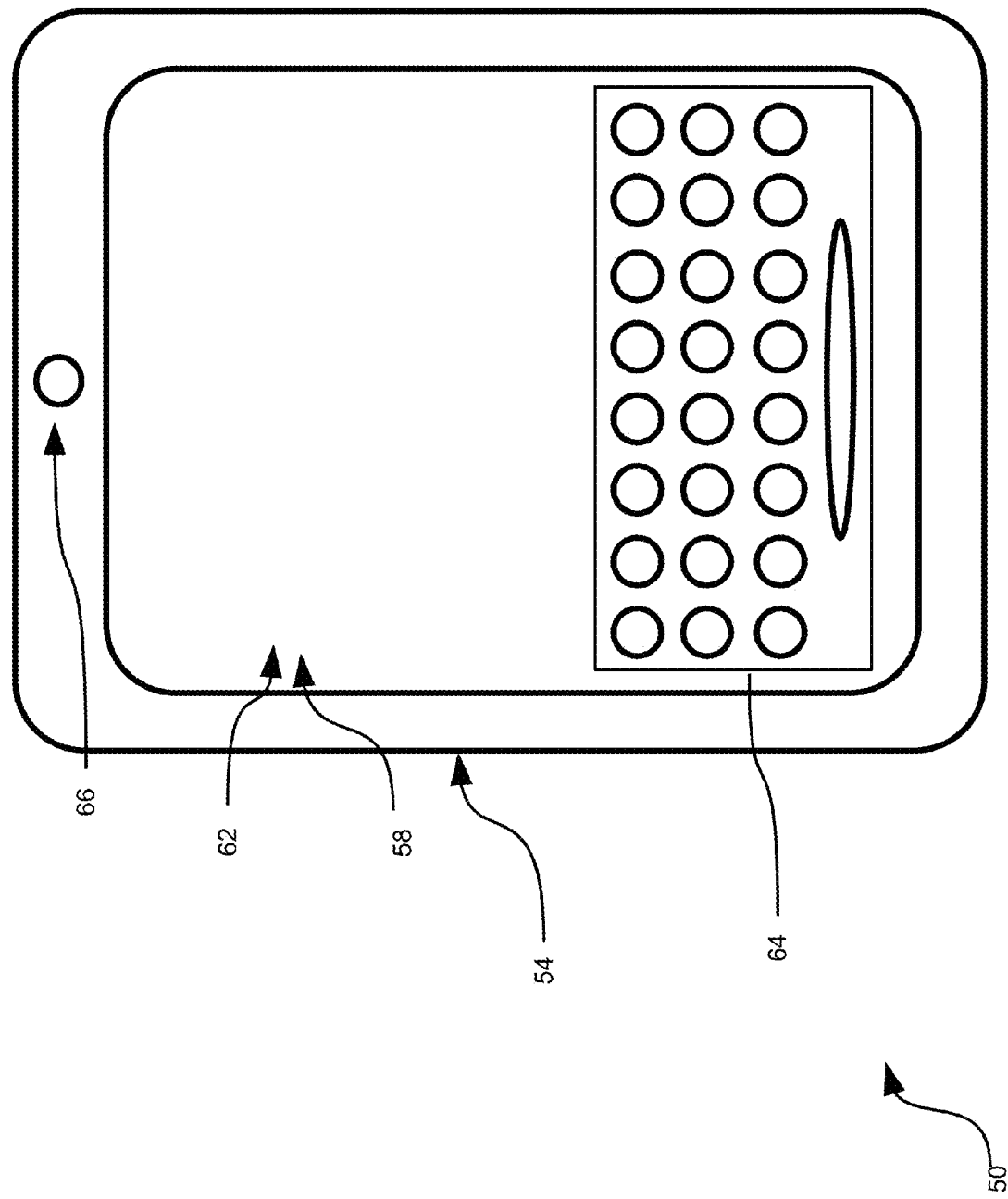
FIG. 1 is a schematic representation of a front view of an exemplary tablet computer.

FIG. 1 is a schematic representation of a non-limiting example of a portable electronic device such as a tablet computer 50 which can be used for as part of a document management system using printer emulation, as discussed in greater detail below. It is to be understood that tablet computer 50 is an example, and it will be apparent to those skilled in the art that a variety of different portable electronic device structures, other than tablet computers, are contemplated. Indeed variations on tablet computing tablet computer 50 can include, without limitation, a cellular telephone, a portable email paging device, a camera, a portable music player, a portable video player, a personal digital assistant, a portable book reader, a portable video game player, a netbook computer, or a laptop computer. Furthermore, variations which involve combinations of any of the above devices are also contemplated. Other contemplated variations include devices which are not necessarily portable, such as desktop computers.

Referring to FIG. 1, tablet computer 50 comprises a chassis 54 that supports a display 58. Display 58 can comprise one or more light emitters such as an array of light emitting diodes (LED), liquid crystals, plasma cells, or organic light emitting diodes (OLED). Other types of light emitters are contemplated. A touch-sensitive membrane 62 is overlaid on display 58 to thereby provide an input device for tablet computer 50. As a non-limiting example, tablet computer 50 can be configured to selectively show or hide a virtual keyboard 64. Other types of input devices can be provided on chassis 54, other than touch membrane 62, or in addition to touch membrane 62, are contemplated. For example, a physical keyboard, or touch-pad, or joystick or trackball or track-wheel, a microphone, or optical camera or any one or more of them can be provided, in addition to or in lieu of touch membrane 62. Such other components may, if desired, be "slide-out" components. In a present implementation, tablet computer 50 also comprises a speaker 66 for generating audio output. Speaker 66 may be implemented as, or augmented with, a wired or wireless headset or both.

Figure 2:
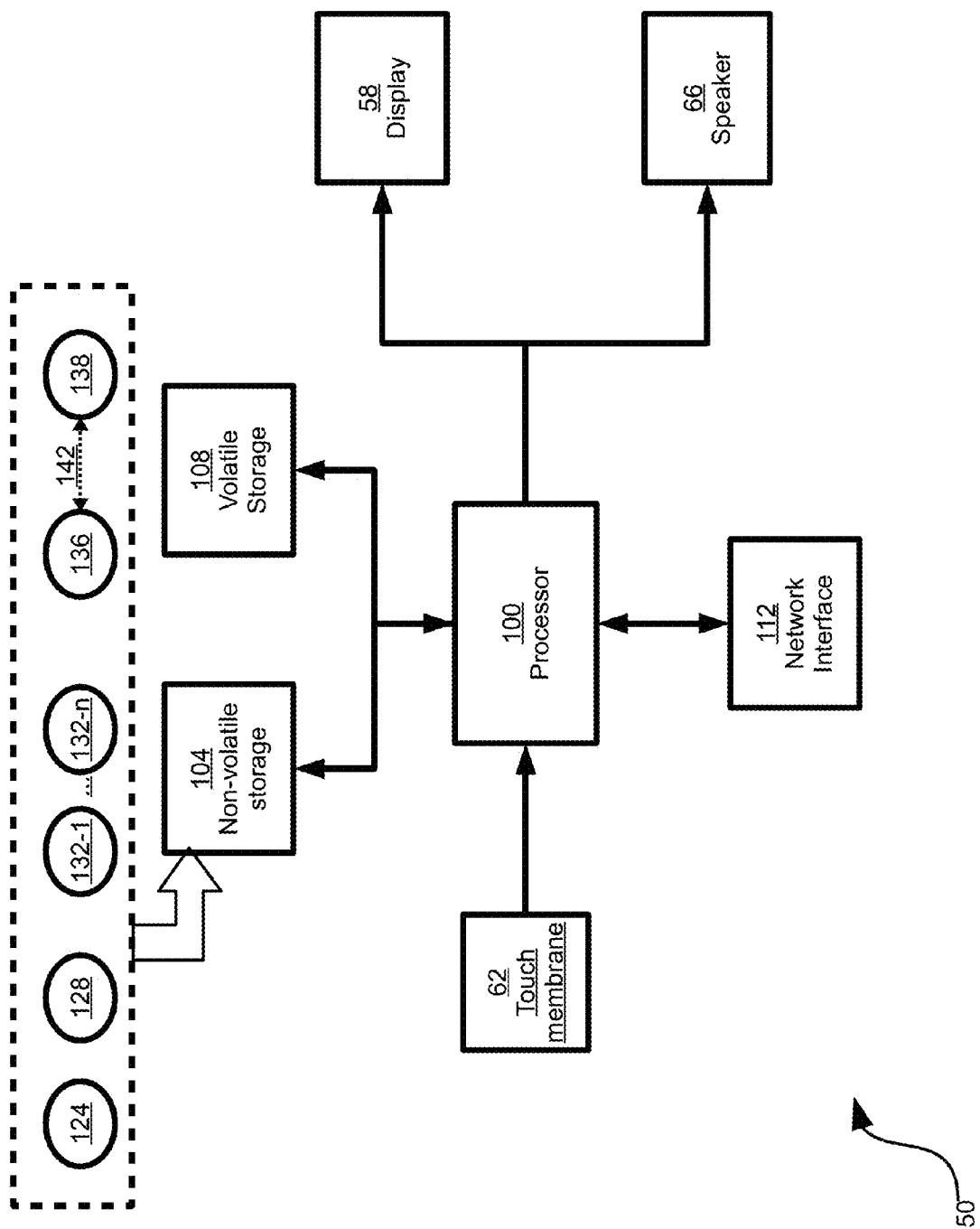
FIG. 2 is a block diagram of the electronic components of the tablet computer shown in FIG. 1.

FIG. 2 shows a schematic block diagram of the electronic components of tablet computer 50. It should be emphasized that the structure in FIG. 2 is a non-limiting example. In FIG. 2, tablet computer 50 includes an input device in the form of a touch membrane 62. (As noted above, other input devices are contemplated even if not expressly discussed herein.) Touch membrane 62 has been discussed above.

Input from touch membrane 62 is received at a processor 100. In variations, processor 100 may be implemented as a plurality of processors or multi-core processors or both. Processor 100 can be configured to execute different programming instructions that can be responsive to the input received via the one or more input devices. To fulfill its programming functions, processor 100 is also configured to utilize electronic memory. Such electronic memory is presently contemplated to comprise at least one non-volatile storage unit 104 (e.g. Erasable Electronic Programmable Read Only Memory ("EEPROM"), Flash Memory) and at least one volatile storage unit 108 (e.g. random access memory ("RAM")). Other configurations of electronic memory are contemplated. Programming instructions that implement the functional teachings of tablet computer 50 as described herein are typically maintained, persistently, in non-volatile storage unit 104 and used by processor 100 which makes appropriate utilization of volatile storage 108 during the execution of such programming instructions.

Processor 100 in turn is also configured to control display 58 and speaker 66 and any other output devices that may be provided in tablet computer 50, also in accordance with different programming instructions and responsive to different input received from the input devices.

Processor 100 also connects to a network interface 112, which can be implemented in a present embodiment as a radio configured to communicate over a wireless link, although in variants tablet computer 50 can also include a network interface for communicating over a wired link. Network interface 112 can thus be generalized as a further input/output device that can be utilized by processor 100 to fulfill various programming instructions. It will be understood that interface 112 is configured to correspond with the network architecture that defines such a link. Present, commonly employed network architectures for such a link include, but are not limited to, Global System for Mobile communication ("GSM"), General Packet Relay Service ("GPRS"), Enhanced Data Rates for GSM Evolution ("EDGE"), 3G, High Speed Packet Access ("HSPA"), Code Division Multiple Access ("CDMA"), Evolution-Data Optimized ("EVDO"), Institute of Electrical and Electronic Engineers ("IEEE") standard 802.11, Bluetooth™ or any of their variants or successors. It is also contemplated each network interface 112 can include multiple radios to accommodate the different protocols that may be used to simultaneously or individually communicate over different types of links.

As will become apparent further below, tablet computer 50 can be implemented with different configurations than described, omitting certain input devices or including extra input devices, and likewise omitting certain output devices or including extra output devices.

Tablet computer 50 is configured to maintain, within non-volatile storage 104, a printer service 124, a document manager 128, and optionally, one or more additional applications 132-1, . . . 132-n. (Generically, additional application 132, and collectively, additional applications 132. This nomenclature is used elsewhere herein.) Printer service 132, document manager 128 and additional applications 132 can be pre-stored in non-volatile storage 104 upon manufacture of tablet computer 50, or downloaded via network interface 112 and saved on non-volatile storage 104 at any time subsequent to manufacture of tablet computer 50.

Processor 100 is configured to execute printer service 124, accessing non-volatile storage 104 and volatile storage 108 as needed. As will be explained further below, printer service 124 is configured to emulate a traditional, paper-based printer such that tablet computer 50 can appear on a network as a printer to other devices connected to that network, so that documents can be virtually printed to tablet computer 50 and stored on non-volatile storage 104 or volatile storage 108 or both from other devices on the network.

Processor 100 is also configured to execute document manager 128, accessing non-volatile storage 104 and volatile storage 108 as needed. The implementation of document manager 128 is not particularly limited, but is generally configured to receive input instructions to browse and access any documents or files stored on tablet computer 50. In particular, virtually printed documents that are received via printer service 124 can be browsed and opened via document manager 128. Document manager 128 can be implemented as a file manager application, or can be part of a document reader or document editor application, or all of them.

Additional applications 132 can be any application that can be stored and executed according to the processor and other resources of tablet computer 50. Such additional applications 132 can also include their own document managers or can be document readers or can be any other type of application as well.

Tablet computer 50 is also configured to maintain a unique identifier 136 for identifying tablet computer 50 from other network devices, as will be discussed further below. Non-limiting examples of possible types of unique identifiers include a serial number for processor 100, or an International Mobile Subscriber Identity (IMSI). Other types of unique identifiers will now occur to those skilled in the art.

Furthermore, tablet computer 50 is also configured to maintain a portable account identifier 138 for associating the tablet computer with a user, as will be discussed further below. Non-limiting examples of possible types of portable account identifiers include an email address, or an International Mobile Subscriber Identity (IMSI). Other types of portable account identifiers will now occur to those skilled in the art.

As will be discussed in greater detail below, a relationship 142 can be established between portable account identifier 138 and unique identifier 136 which can be used to address print requests to tablet computer 50. Of note is that the term relationship is used in its technical sense, to refer to, for example, a unique number that represents the pairing of portable account identifier 138 and unique identifier 136. Such a unique number may be a hash or a concatenation, or can be generated using any desired computing operation.

Figure 3:
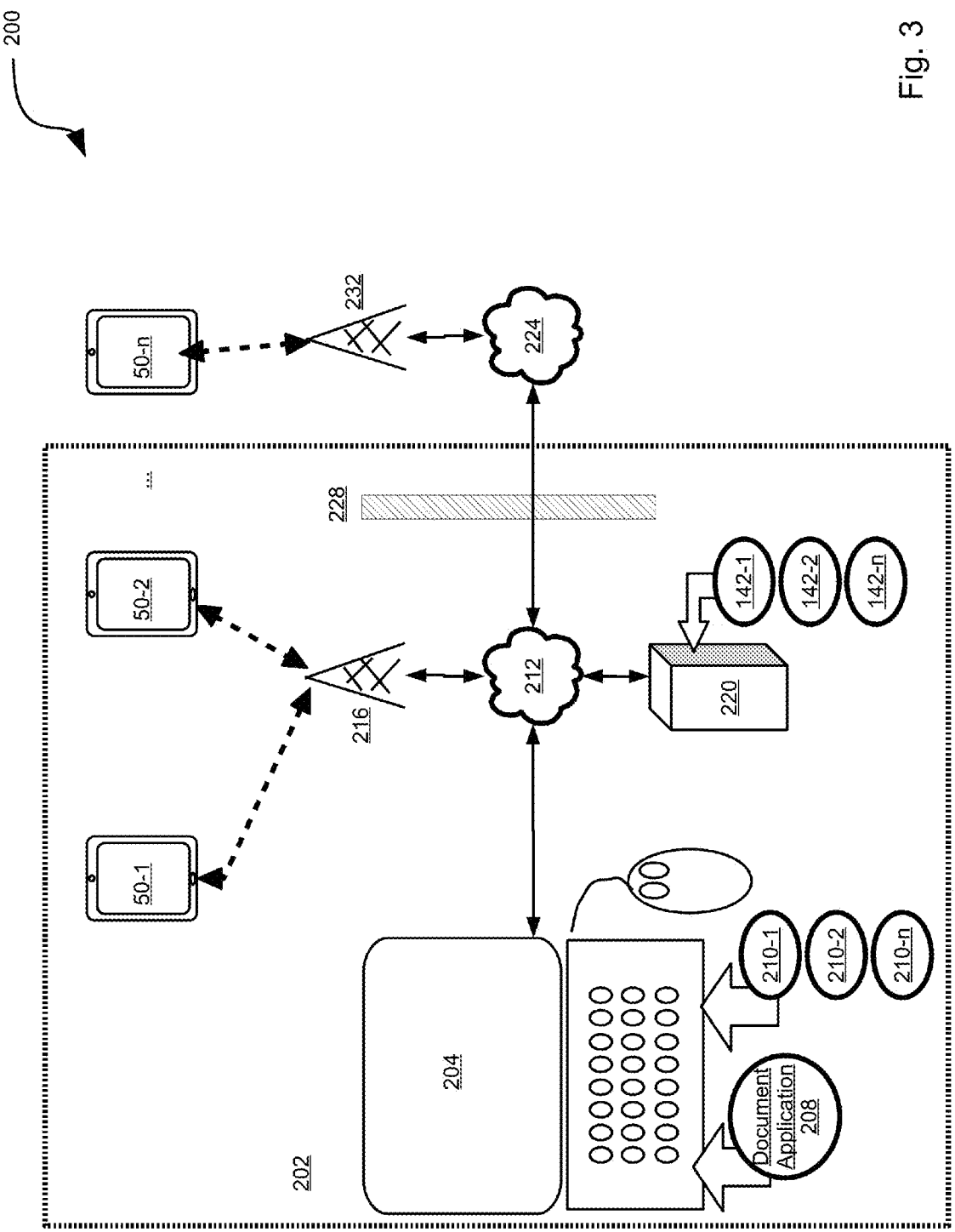
FIG. 3 shows a system for document management incorporating a plurality of the devices of FIG. 1.

Referring now to FIG. 3, a document management system using printer emulation in accordance with another embodiment is shown generally at 200. System 200 generally contemplates an enterprise configuration 202 that comprises a plurality of tablet computers 50 that are all associated with an enterprise configuration 202.

Enterprise configuration 202 thus comprises at least one workstation 204 configured to execute a document application 208. The nature of document application 208 is not particularly limited, and can be, for example, a word processor, a spreadsheet editor, a web browser, a presentation creation application or any other application where a print function is included that permits generation of a document from documentation application 208 onto a printer (not shown).

The at least one workstation 204 is also configured to maintain a virtual printer driver 210 respective to one or more of tablet computers 50. While FIG. 3 shows workstation 204 maintaining a printer driver 210 respective to each tablet computer 50, workstation 204 need not maintain a printer driver 210 for all tablet computers 50. Thus, document application 208 can also be used to send a print request to any tablet computer 50 that has its respective printer driver 210 installed on workstation 204.

Printer driver 210 is generally configured to conform with specification for the operating system that is native to workstation 204, thereby obviating the need to materially modify workstation 204 in order to implement the present specification. By the same token output files generated using printer driver 210 are generally configured to conform with the computing environment of its respective tablet computer 50. Thus, printer driver 210 can be configured to include, the ability to define, on virtual-printing of a document from document application 208, various printing options, such as which pages to print, number of pages per sheet, watermarking, portrait vs landscape mode, paper size, resolution, colour vs grayscale vs black-and-white, scaling, margins and the like. In certain implementations, The printer driver 210 could be configured to utilize a standard script such as Postscript. The options provided can also consider the computing environment of the destination tablet computer 50, such as screen size, screen resolution, available processing and memory resources, such that output file that is sent is optimized or otherwise consistent with that computing environment. Printer drivers 210 can also be configured to be processing-intensive such that output files generated at workstation 204 are substantially completely rendered at workstation 204 for display on the destination tablet computer 50. Alternatively, printer drivers 210 can be configured to consume as little processing resources as possible at workstation 204 so that the majority of processing and rendering occurs at the destination tablet computer 50. Other aspects of printer drivers 210 will be discussed further below.

Enterprise configuration 202 also comprises a private network 212 to which workstation 204 can connect. Private network 212 also connects to an enterprise wireless base station 216 and an enterprise server 220, both of which are also associated with enterprise configuration 202. Private network 212 can also connect to various other computing devices (not shown), such as additional workstations, or printers, or file servers, or print servers that are associated with the enterprise. Private network 212 also connects to a public network 224 through an enterprise firewall 228.

Private network 212 can be based on any known local area network architectures, such as the Internet Protocol (IP) network running over Ethernet. Wireless base station 216 is typically a wireless local area network (WLAN) base station utilizing IEEE standard 802.11 or one of its variants. Tablet computers 50 can all connect to private network 212 via wireless base station 216 using their respective network interfaces 112. In FIG. 3, only tablet computer 50-1 and tablet computer 50-2 are shown connected to wireless base station 216, but it is to be understood that tablet computer 50-n can also connect to wireless base station 216. Typically, a given tablet computer 50 will associate with wireless base station 216 when in range of wireless base station 216.

As will be discussed further below, enterprise server 220 is configured to manage a network printer address for tablet computer 50 that is used to route a print request from workstation 204 (or another workstation) based on relationship 142 between portable account identifier 138 and unique identifier 136.

Public network 224 typically comprises the Internet as well as interconnections with other types of public networks such as cellular telecommunication networks or WIFI hotspots. Accordingly, one or more base stations 232 are connected to public network 224. Base station 232 can thus be based on core mobile telecommunication network protocols (E.g. 3G, EDGE, as discussed above) or can be based on WLAN architectures such as public mobile hotspots. It is contemplated that a plurality of base stations 232 can be typically provided, any one or more of which can be associated with a given tablet computer 50. In FIG. 3, only tablet computer 50-n is shown connected to wireless base station 232, but it is to be understood that tablet computer 50-1 or tablet computer 50-2 can also connect to wireless base station 232. Typically, a given tablet computer 50 will associate with wireless base station 232 when in range of wireless base station 232, and utilize that association when that tablet computer 50 is not within range of wireless base station 216.

Figure 4:
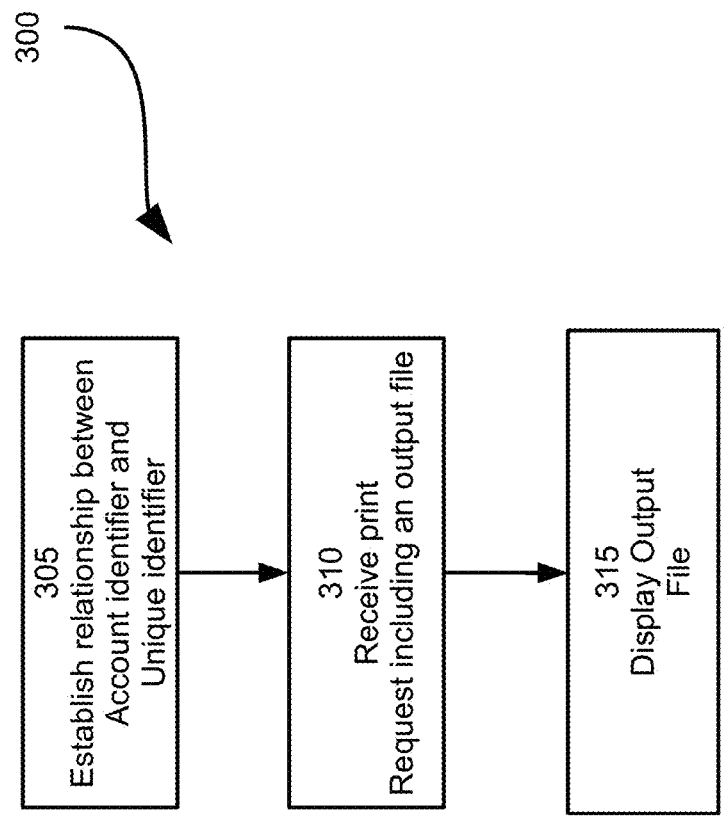
FIG. 4 shows a flowchart depicting a method for document management.

Referring now to FIG. 4, a flowchart depicting a method for document management using printer emulation is indicated generally at 300. Method 300 is one way in which printer service 124 on the tablet computer 50 can be implemented. It is also emphasized that the method 300 can be varied and that the method 300 need not be performed in the exact sequence as shown. To assist in discussion of method 300, a specific example to its performance will be discussed in relation to tablet computer 50 and system 100.

Block 305 comprises establishing a relationship in electronic memory between a portable account identifier and a unique identifier. In tablet computer 50, block 305 comprises establishing relationship 142 between unique device identifier 136 and portable account identifier 138. Block 305 can be performed once when tablet computer 50 is originally provisioned with an account (not shown), such provisioning including associating the unique device identifier 136 of tablet computer 50 with the portable account identifier 138. It can be thus be noted that relationship 142 can subsequently be terminated, and that portable account identifier 138 can be associated with other tablet computers 50.

Block 310 comprises receiving a print request over a network. In system 100, the print request originates from workstation 204. The print request includes an output file. The print request is created from document manager 208 using the printer driver 210 maintained on workstation 204 that is associated with its respective tablet computer 50. The network printer address for the tablet computer 50 that is used to route the print request is managed by server 220 based on the relationship between the portable account identifier and the unique identifier. The means by which server 220 manages the network printer address is not particularly limited, and various non-limiting examples of such management will be discussed below.

In tablet computer 50, the print request is received at print service 124 of tablet computer 50.

Block 315 comprises displaying the output file that was part of the print request at block 310. In tablet computer 50, block 315 can be effected by print service 124 transferring the output file received at block 315 to the document manager application 128 within tablet computer 50. When the document manager application 128 is executed on processor 100, then the output file is generated on display 58 under the control of processor 100. It will thus be apparent that block 315 need not occur immediately and that the output file can be stored on tablet computer 50 until such time as block 315 is invoked.

Figure 5:
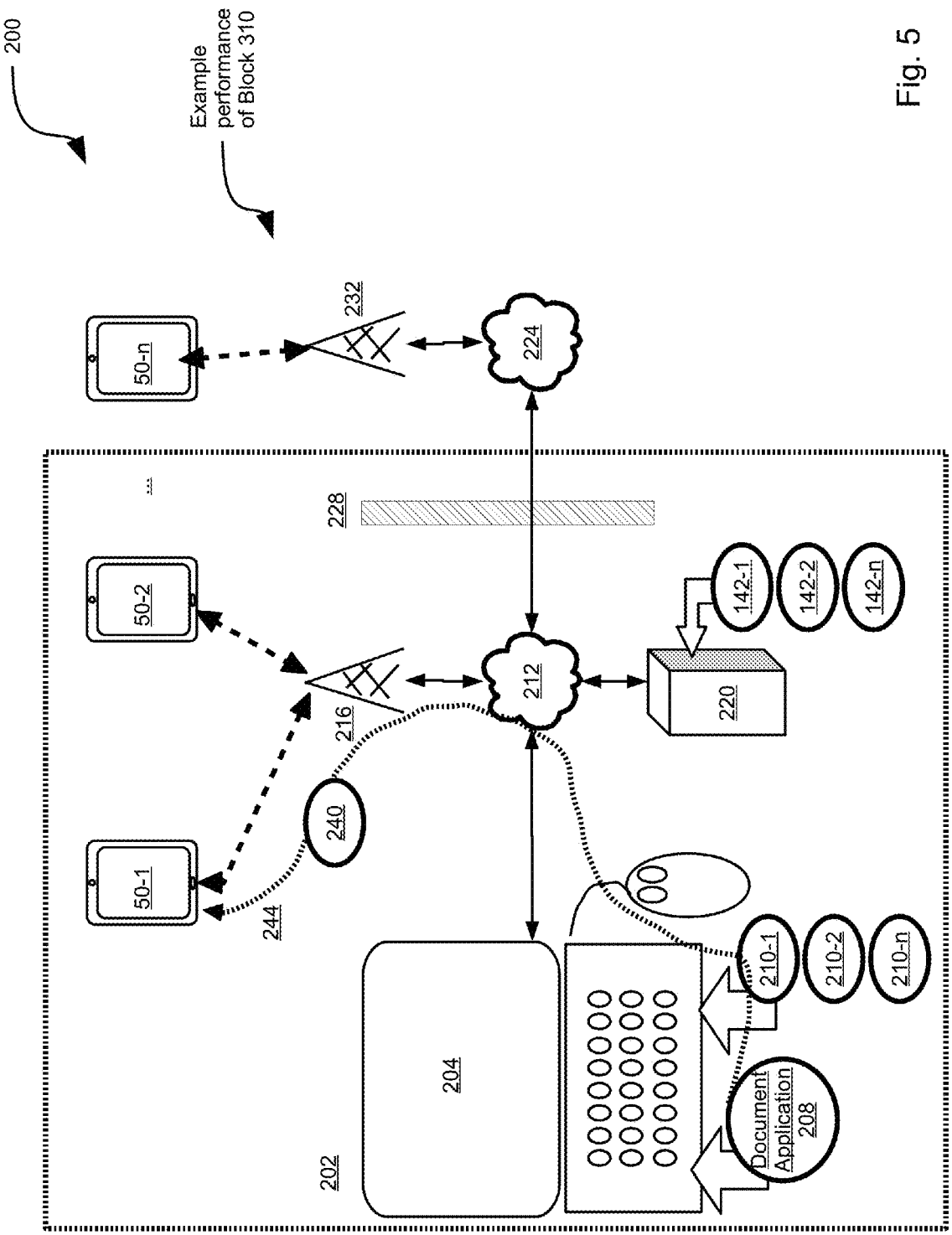
FIG. 5 shows a variation on the system of FIG. 3 providing an example of one way in which block 310 of the method of FIG. 4 can be implemented.

As noted above, the means by which server 220 manages the network printer address used to send print requests from workstation 204 to a given tablet computer 50 is not particularly limited. FIG. 5 shows one example of how block 310 can be implemented resulting from one example of how server 220 can manage the network printer address. In FIG. 5, system 200 is shown with a print request 240 being sent from document application 208 directly to tablet computer 50-1 via printer driver 210-1 along a pathway 224. Pathway 224 thus contemplates that print request 240 is addressed directly to tablet computer 50-1. Thus, in FIG. 5, printer driver 210-1 is equipped with the direct network printer address of tablet computer 50-1 by server 220.

Figure 6:
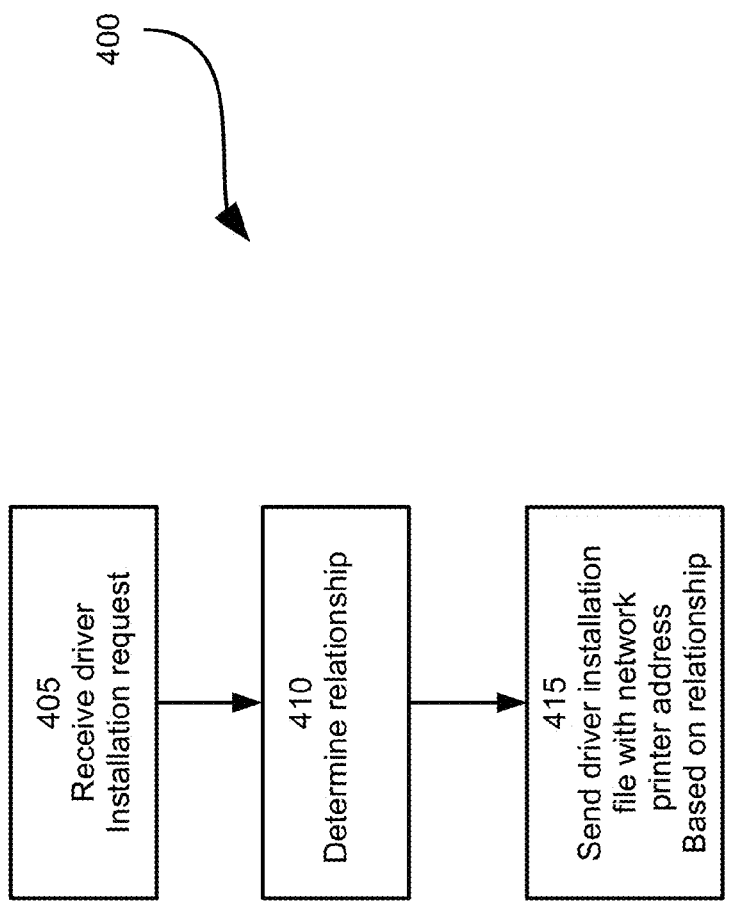
FIG. 6 shows a flowchart depicting a method for installing a printer driver on a workstation.

Referring now to FIG. 6, a flowchart depicting a method for virtual printer driver installation is indicated generally at 400. Method 400 thus contemplates one way in which driver 210-1 that utilizes pathway 244 of FIG. 5 can be installed on workstation 204. It is to be noted that method 400 can be varied and that the method 400 need not be performed in the exact sequence as shown.

Block 405 thus comprises receiving a driver installation request. The driver installation request can be effected using printer driver installation wizards that are native to the operating system used on workstation 204. For example, in a Windows XP™ environment, the "Add Printer Wizard" can be used can be used to browse for a network printer. It can now be noted that this example implementation presents one of the advantages of this specification, for no third-party software or application need be installed on workstation 204 in order to install the printer driver 210, thereby providing an implementation for system 200 without modifying workstation 204 except to provide workstation 204 with a printer driver that conforms with the operating system specifications for workstation 204.

Figure 7:
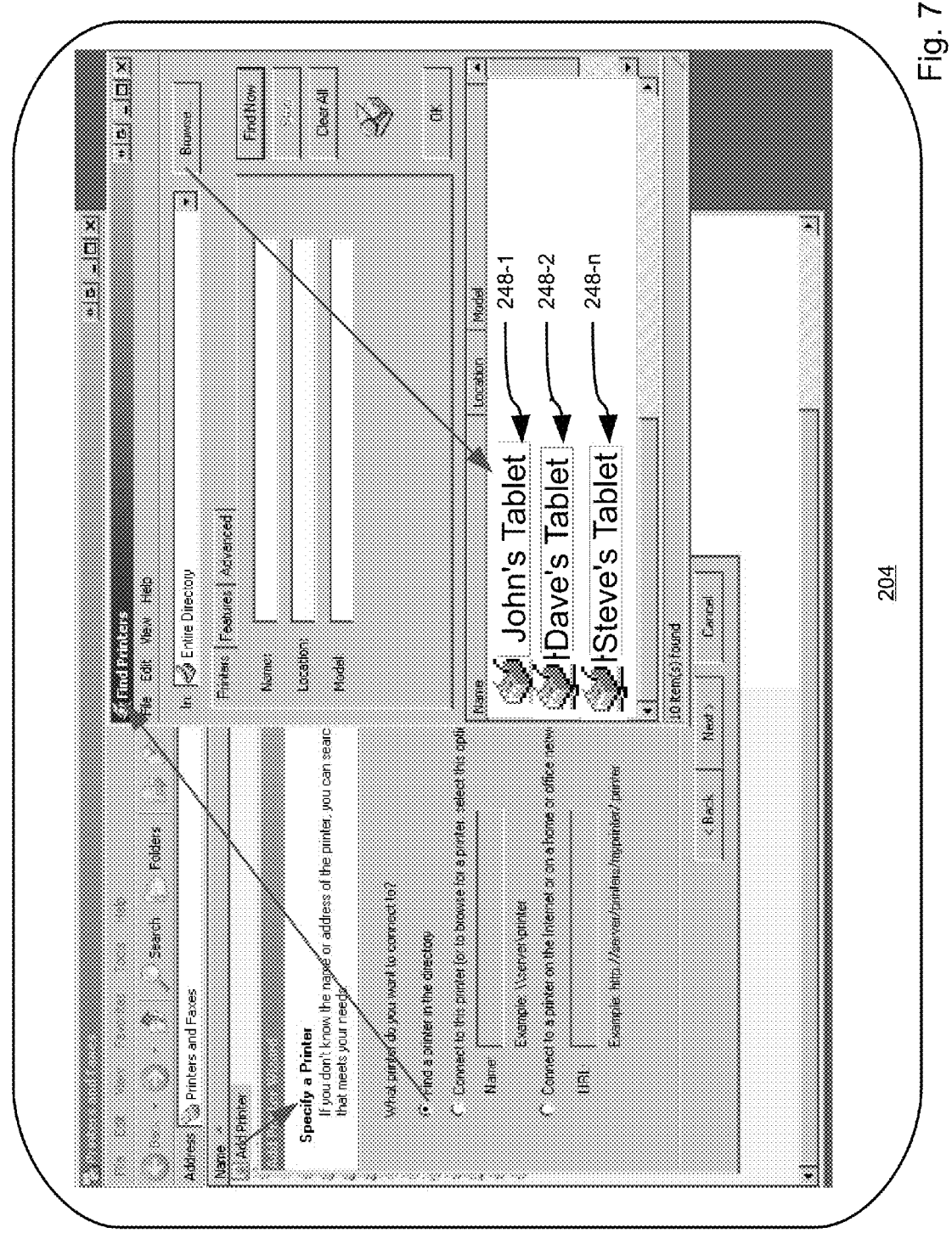
FIG. 7 shows an example graphical interface that can be generated on the workstation as part of performance of the method of FIG. 6.

Server 220 is configured to host virtual representations of the print service 124 for each tablet computer 50 that are browsable by workstation 204 over private network 212. (However, it is to be understood that browsing is only one such way that native printer driver installation wizards may be utilized according to this specification.) Such browsing may be either directly to server 220, or via another server (not shown) that hosts a directory of printers available to workstation 204. FIG. 7 shows an example graphic interface that can be generated on the display of workstation 204 using the standard Windows XP™ "Add Printer Wizard", to browse a printer network directory, and ultimately generate a driver installation request consistent with block 405. In the example of FIG. 7, three virtual printers are offered according to the native Windows XP environment, with account labels 248 under the "Name" column. (Again, the example in FIG. 7 can be modified to work with other operating systems including other Windows operating systems, or Linux operating systems, or MACOS operating systems, or others). Specifically account label 248-1 reads "John's Tablet", account label 248-2 reads "Dave's Tablet" and account label 248-n reads "Steve's Tablet". (Other printers or virtual printers connected to network 212 which are part of the directory can also be shown).

For discussion purposes, Table I provides an example initial relationship between the virtual printers as labeled in FIG. 7 and tablet computers 50, the contents of Table I being maintained by server 200.

TABLE I

First Example of Accounts, Identifiers and Relationships

| ACCOUNT LAYER | | DEVICE LAYER | | |
|---|---|---|---|---|
| Account Label 248 | Account Identifier 138 | Tablet Computer 50 | Unique Identifier 136 | RELATIONSHIP LAYER Relationship 142 |
| Label 248-1 ("John's Tablet") | 138-1 | 50-1 | 136-1 | 142-1 |
| Label 248-2 ("Dave's Tablet") | 138-2 | 50-2 | 136-2 | 142-2 |
| Label 248-n ("Steve's Tablet") | 138-n | 50-n | 136-n | 142-n |

As emphasized above, Table I represents an initial relationship but it is contemplated as part of this specification that such relationships can change and dynamically accommodated such that the risk of a document being virtually printed to an incorrect tablet computer 50 is reduced or mitigated. Thus, the "Account Label 248" column refers to the labels shown in FIG. 7, and which in turn are associated in a fixed relationship with specific account identifiers 138 which are listed in the "Account identifier 138" column, and thus the "Account Label 248" column and the "Account identifier 138" column appear under the heading "Account Layer"

The "Tablet Computer" column refers to three tablet computers 50 shown in system 200 in FIG. 3 and FIG. 5 and elsewhere, which are in turn associated in a fixed relationship with the specific unique identifiers 136 which are listed in the "Unique Identifier 136" column, and thus the "Tablet Computer 50" column and the "Unique Identifier 136" column appear under the heading "Device Layer".

The "Relationship 142" column refers to the specific relationship between various accounts and devices and it is this relationship that can change.

Returning now to the discussion of block 405 of method 400, assume that an instruction is received at workstation 204 selecting "John's Tablet", to thereby generate a printer driver installation request in that is finally received at server 220. Accordingly, block 410 comprises determining a relationship between the account label within the driver installation request and a particular tablet computer. Continuing with the example, based on an examination of Table I, relationship 142-1 applies in that "John's Tablet" is associated with tablet computer 50-1.

Block 415 comprises sending the driver installation file with a network printer address for the tablet computer 50 as determined based on the relationship at block 410. Continuing with the example, driver 210-1 will be sent from server 220 to workstation 204 and which will include a network address for virtually printing directly to device 50-1 utilizing pathway 244 of FIG. 5. Once received at workstation 204, printer driver 210-1 can be installed locally on workstation 204 according to the printer driver installation methods native to the operating system of workstation 204.

Having completed block 415, method 300 can be performed according to the specific example performance of block 310 in FIG. 5 as discussed above. As noted above, however, the contents of Table I may change such that relationships 142 may no longer apply. The result is that there is a possibility of a document being printed from document application 208 to an incorrect tablet computer 50. This can be particularly of concern if the documents being generated are of a sensitive or confidential nature. For example, assume that tablet computer 50-1 is lost or stolen. Accordingly, Table II shows an example of how Table I is updated in server 220 to reflect that tablet computer 50-1 is no longer associated with enterprise configuration 202.

TABLE II

Second Example of Accounts, Identifiers and Relationships (Updated from Table I)

| ACCOUNT LAYER | | DEVICE LAYER | | |
|---|---|---|---|---|
| Account Label 248 | Account Identifier 138 | Tablet Computer 50 | Unique Identifier 136 | RELATIONSHIP LAYER Relationship 142 |
| Label 248-1 ("John's Tablet") | 138-1 | NONE | NONE | NONE |
| Label 248-2 ("Dave's Tablet") | 138-2 | 50-2 | 136-2 | 142-2 |
| Label 248-n ("Steve's Tablet") | 138-n | 50-n | 136-n | 142-n |

Thus, when method 400 is performed when Table II is maintained in server 200, it will not be possible to install a printer driver associated with "John's Tablet" and account identifier 138-1, thereby blocking the ability to send a printer output file from workstation 204.

In another scenario, however, Table I may be updated to Table II after printer driver 210-1 has already been installed on tablet computer 50-1, leading to the possibility that workstation 204 could still be used to send a confidential or sensitive document to tablet computer 50-1 resulting in unauthorized access to that document. The present specification contemplates various controls to mitigate or reduce the likelihood of such unauthorized access occurring.

One technique contemplates that printer service 124 is configured to verify that its local relationship 142 is valid before accepting or processing print request 240. Thus a copy of relationship 142 can be included in print request 240 and then upon receipt of print request, printer service 124 will verify that the relationship 142 received in the print request 240 matches the relationship 142 stored locally on the tablet computer 50-1. Thus, according to this technique, tablet computer 50-1 is configured to sing existing techniques tablet computer 50-1 can also be remotely wiped such that account identifier 138 and relationship 142 are deleted from tablet computer 50-1 during the remote wipe, so that printer service 124 will fail to validate the relationship and refuse to accept the print request. Another variation contemplates that the printer network address is itself managed by printer service 124, and thus the remote wipe will automatically render the tablet computer 50-1 unaddressable in the print request 240. A still further technique contemplates the use of an encryption methodology based on relationship 142, such that the printer driver 210 will utilize relationship 142 as part of encryption key to generate print request 240. Relationship 142 can be used as the encryption key itself, thus, the wiping of relationship 142 from tablet computer 50-1 will result in the wiping of the encryption key. Additional security can be provided by having relationship 142 be an index to an decryption key that is generated elsewhere (e.g. server 220) and then stored on tablet computer 50-1, (with the corresponding encryption key being incorporated directly into printer driver 210-1), again such that the decryption key is wiped upon a remote wipe of tablet computer 50-1.

Figure 8:
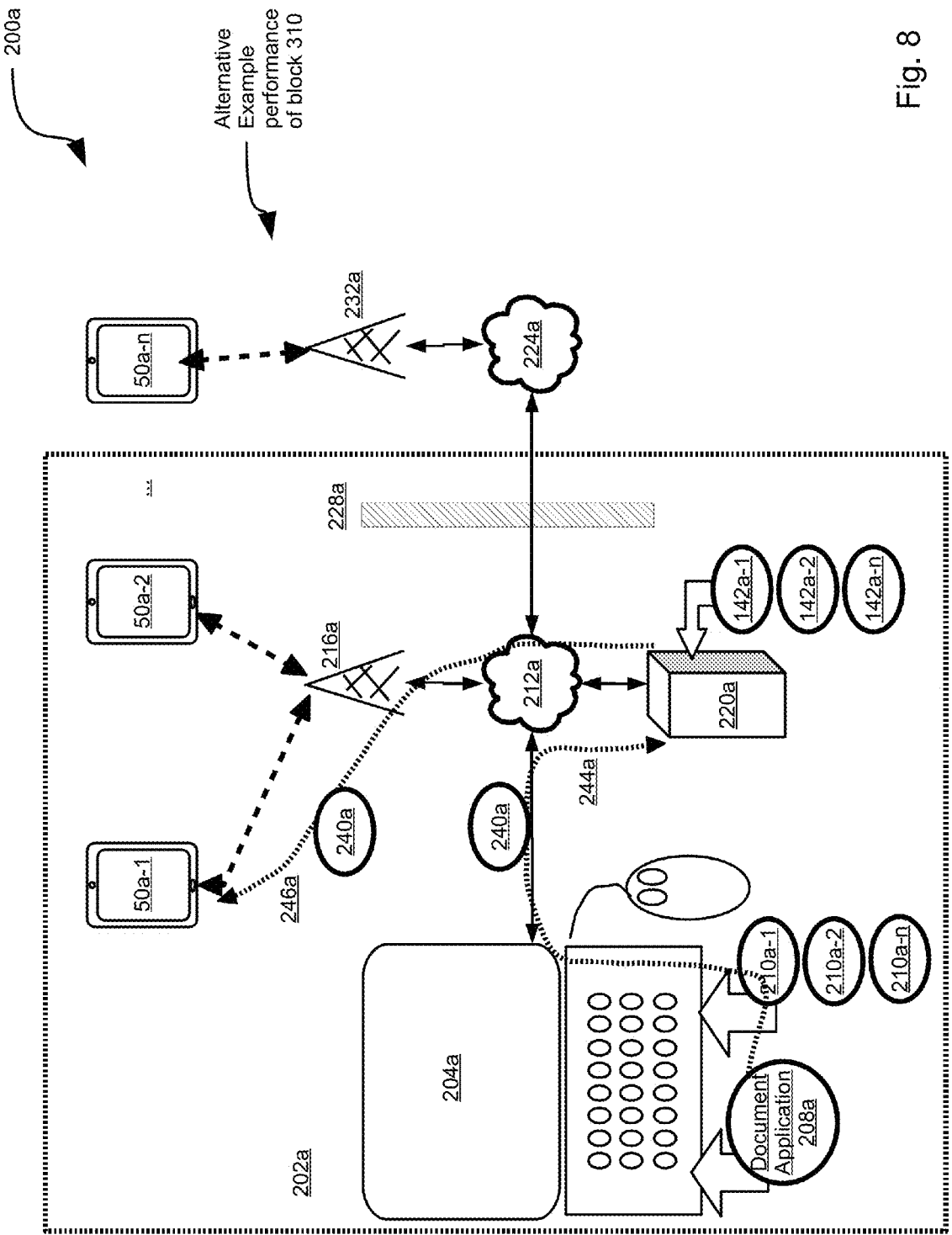
FIG. 8 shows another variation on the system of FIG. 3 providing another example of a way in which block 310 of the method of FIG. 4 can be implemented.

Referring now to FIG. 8, another system for document management is indicated generally at 200a. System 200a is a variation on system 200 and thus like references bear like elements except followed by the suffix "a". Of note is that system 200a contemplates another approach to implementing block 310, whereby print requests 240a are always carried through server 220a. In this manner further security can be afforded without concern about the state of the printer driver 210a as installed on workstation 204a, since the validity of all print requests are centrally administered by server 220a. Indeed, when Table I changes to Table II, server 220a can be configured to simply refuse print requests from workstation 204a and return an error to workstation 204a. Furthermore, when there is a change of one account to another tablet computer 50a, then an installed printer driver 210a need not necessarily be updated, but rather server 220a will automatically route the print request 240a associated with one account to the new tablet computer 50a.

In a further variation, server 220a can be configured to locally host a print service 124 for each tablet computer 50a, and then to send the document to the document manager 128 on the destination tablet computer 50a, thereby obviating the need for a print service 124 on each tablet computer 50a and facilitating the use of the present specification on legacy tablet computers 50a or other legacy computer devices. In this example, the output file can be converted to an email attachment that is sent to the correct tablet computer 50a as an email attachment (e.g. as a PDF, TIFF, JPG or other standard image file) to document manager 128 or other application within the destination tablet computer 50a.

Advantageously, the functionality of server 220a can be incorporated directly into existing enterprise servers, such as an Microsoft Exchange Server, or a BlackBerry Enterprise Server, leveraging off of existing infrastructure in the existing enterprise server. Furthermore different layers of encryption can be provided between workstation 204a and server 220a, or between server 220a and tablet computers 50a.

Figure 9:
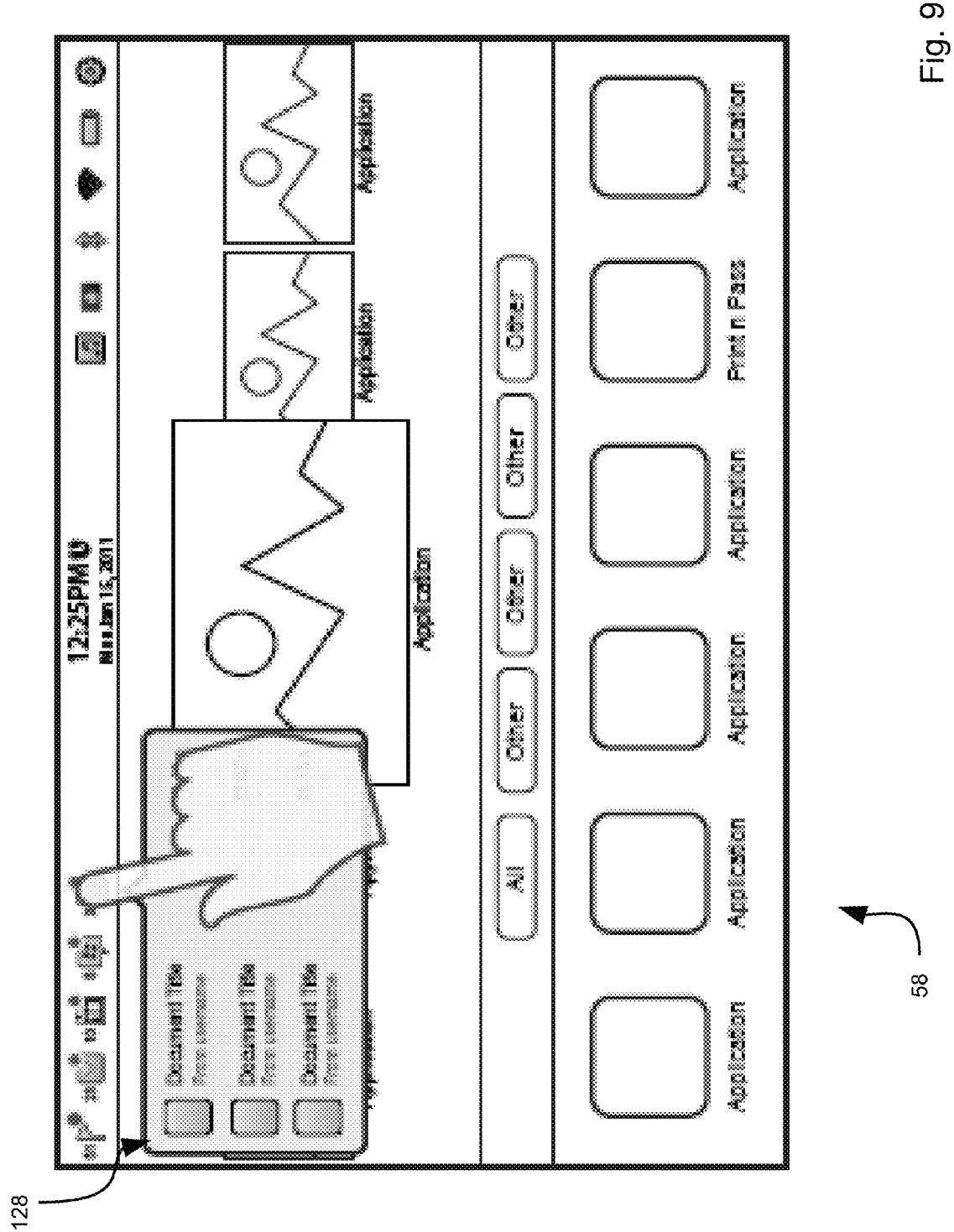
FIG. 9 shows an example of a document manger application on a display of the tablet computer of FIG. 1 that can be used to browse documents received on the tablet computer using the method of FIG. 3 or its variants.

FIG. 9 shows an example of a document manager application on a display of the tablet computer of FIG. 1 that can be used to browse documents received on the tablet computer using the method of FIG. 3 or its variants.

Figure 10:
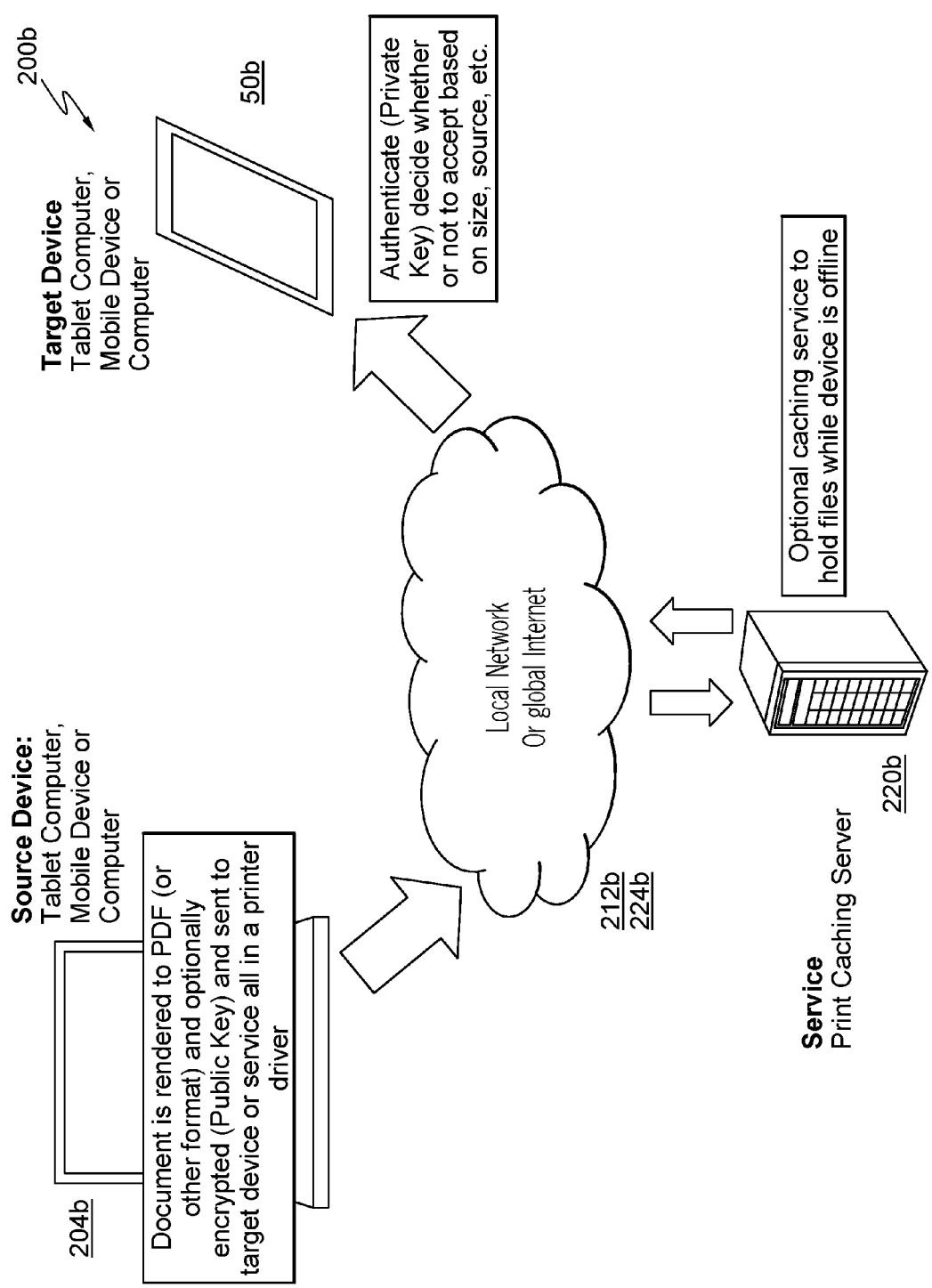
FIG. 10 shows another system for document management.

FIG. 10 shows another example system for document management indicated generally at 200b. System 200b is a generalized version of system 200. System 200b contemplates, amongst other things, that server 220b can optionally be used to cache or spool output files received from workstation 204b destined for tablet 50b when tablet 50b is offline.

Certain other general features are contemplated in variations. For example, in a less secure context tablet 50 can be configured to advertise itself as an available printer on a network bypassing server 220 altogether. As another example, tablet 50 can be configured with near field communication apparatuses which can be detected by workstation 204 and used to obtain and establish a printer driver 210.

As another example, tablet 50 can be configured to send an email or other electronic communication to workstation 204. Such an electronic communication can be configured to include a dedicated printer driver 210, or a link to such a dedicated printer driver 210. Upon receipt of the electronic communication workstation 204 can be configured to utilize the electronic communication to install the dedicated printer driver 210.

For added security, temporary public encryption keys can be used to install the printer drivers 210. Alternatively, such encryption keys can be configured to permit a "single print" from the workstation 204 and thereafter be unusable for sending printed files directly to tablet 50. (e.g. the printer driver 204 expires after one print). In the case of the temporary key, printer driver 204 can be configured to remove itself from the list of printer devices after expiry.

Alternatively, once paired, the target appears as a printer on the source device until it is removed.

Alternatively, tablet computer 50 can be configured to require or automatically accept submitted files to include source signature authentication.

Tablet computer 50 can also be configured to send a notification warning that print request 240 is being sent. Alternatively, or in addition, tablet computer 50 can be configured to automatically accept or deny the print request 240 based on characteristics such as file size, format etc. Such a notification can be sent by email, text message or the like. Likewise a notification can also be sent to workstation 204.

In another variation, server 220 can be configured to receive a print request 240 from workstation 204, and then configured to in turn send that print request 240 to a plurality of different tablet computers 50, caching the print request 240 until a particular tablet computer 50 comes back on line. Most general case of this could be a print to email service Workstation 204 can also be configured to, via the printer driver 210 or other means, print the file with a hash of the file encoded with its private key so that tablet computer 50 can confirm that it does come from a known source via the public key for that workstation 204.

Workstation 204 can also be configured to receive a fax on behalf of a given tablet computer 50 and then to send that fax as a print requests 240 to the tablet computer 50.

In a further variation it is contemplated that the WiFi Direct™ or similar technology enabling Wi-Fi devices to connect directly, for operations such as printing, sharing, synching and displaying.

While specific embodiments of the invention have been described and illustrated, such embodiments should be considered illustrative of the invention only and not as limiting the invention as construed in accordance with the accompanying claims.

The invention claimed is:

1. A method comprising:
at a computing device comprising a memory storing a portable account identifier associated with a portable account and a unique identifier associated with a portable electronic device,
receiving a document for display on a display device of the portable electronic device;
transforming the document into an output file that conforms to a computing environment of the portable electronic device;
transmitting, to a server, a query for a network address associated with the portable electronic device, the query including the portable account identifier and the unique identifier,
receiving, from the server, the network address associated with the portable electronic device, the network address provided by the server being based on the association of the portable account identifier associated with the portable account with the unique identifier associated with the portable electronic device; and,
transmitting, to the network address associated with the portable electronic device, a print request for displaying the output file on the display of the portable electronic device, the print request comprising the output file.

2. The method of claim 1, wherein transforming comprises transforming the document into the output file using PostScript.

3. The method of claim 1, wherein the output file conforms to an operating system of the portable electronic device.

4. The method of claim 1, further comprising:
at the computing device associated with the portable electronic device, receiving data transmitted by the portable electronic device, the data including at least one of a size of the display device of the portable electronic device, a resolution of the display device of the portable electronic device, screen resolution, available processing resources of the portable electronic device, and available memory resources of the portable electronic device.

5. The method of claim 4, wherein transforming comprises transforming the document file based on the data received at the computing device.

6. The method of claim 1, wherein receiving further comprises receiving at least one print option associated with the document, and wherein comprises transforming the document based on the at least one print option that is received.

7. The method of claim 6, wherein each of the at least one print option is selected from the group consisting of an identification of which pages of the document to display at the display of the portable electronic device, a page size for the document, a display resolution for the document, a display orientation for the document, display margins for the document, watermarking for the document, scaling for the document, and a colour for displaying the document.

8. The method of claim 1, wherein transmitting comprises:
establishing a secure network connection between the communications system of the computing device and a network interface of the portable electronic device; and,
transmitting the print request to the portable electronic over the secure network connection.

9. The method of claim 8, wherein the secure network connection is established using HyperText Transport Protocol Secure (HTTPS).

10. The method of claim 1, further comprising:
at the computing device, encrypting the output file prior to transmitting the print request.

11. A computing device comprising:
a communications system; and,
a memory storing an a portable account identifier associated with a portable account and a unique identifier associated with a portable electronic device; and,
a processor operably coupled to the memory and the communications system, the processor configured to:
receive a document for display on a display device of the portable electronic device;
transform the document into an output file that conforms to a computing environment of the portable electronic device;
transmit using the communication system, a query for a network address associated with the portable electronic device, the query including the portable account identifier and the unique identifier;
receive, using the communication system, the network address associated with the portable electronic, the network address provided by the server being based on association of a portable account identifier associated with the portable account with the unique identifier associated with the portable electronic device; and,
transmit, using the communications system, a print request to the network address associated with the portable electronic for displaying the output file on the display device of the portable electronic device, the print request comprising the output file.

12. The computing device of claim 11, wherein the processor is further configured to transform the document using PostScript.

13. The computing device of claim 11, wherein the output file conforms to an operating system of the portable electronic device.

14. The computing device of claim 11, wherein the processor is further configured to:
receive data transmitted by the portable electronic device, the data including at least one of a size of the display device of the portable electronic device, a resolution of the display device of the portable electronic device, screen resolution, available processing resources of the portable electronic device, and available memory resources of the portable electronic device.

15. The computing device of claim 14, wherein the processor is further configured to transform the document based on the data received at the computing device.

16. The computing device of claim 11, wherein the processor is further configured to:
receive at least one print option associated with the document, and
transform the document based on the at least one print option that is received.

17. The computing device of claim 11, wherein the processor is further configured to:
establish a secure network connection between the communications system of the computing device and a network interface of the portable electronic device; and,
transmit the print request over the secure network connection.

18. The computing device of claim 17, wherein the secure network connection is established using HyperText Transport Protocol Secure (HTTPS).

19. A non-transitory computer-readable medium comprising computer-readable instructions executable by a processor of a computing device comprising a memory storing a portable account identifier associated and a portable account with a unique identifier associated with a portable electronic device to:
- receive a document for display on a display of the portable electronic device;
- transform the document into an output file that conforms to a computing environment of the portable electronic device;
- transmit, to a server, a query for a network address associated with the portable electronic device, the query including the portable account identifier and the unique identifier;
- receive, from the server, the network address associated with the portable electronic device, the network address provided by the server being based on the association of a portable account identifier associated with the portable account with the unique identifier associated with the portable electronic device; and,
- transmit, to the network address associated with the portable electronic device, a print request for displaying the output file on the display device of the portable electronic device, the print request comprising the output file.

20. The non-transitory computer-readable medium of claim 19, further comprising:
- receive data transmitted by the portable electronic device, the data including at least one of a size of the display device of the portable electronic device, a resolution of the display device of the portable electronic device, screen resolution, available processing resources of the portable electronic device, and available memory resources of the portable electronic device; and
- wherein the processor is further configured to transform the document based on the data received at the computing device.

* * * * *